US012253221B2

(12) United States Patent
Chen et al.

(10) Patent No.: US 12,253,221 B2
(45) Date of Patent: Mar. 18, 2025

(54) MULTIFUNCTIONAL AND VARIABLE LAMP SHEET AND LAMP

(71) Applicant: Dongguan Renzheng lighting electric Appliance Co., LTD, Dongguan (CN)

(72) Inventors: Tian Chen, Dongguan (CN); Li Fang, Dongguan (CN)

(73) Assignee: Dongguan Renzheng lighting electric Appliance Co., LTD, Dongguan (CN)

( * ) Notice: Subject to any disclaimer, the term of this patent is extended or adjusted under 35 U.S.C. 154(b) by 0 days.

(21) Appl. No.: 18/771,858

(22) Filed: Jul. 12, 2024

(65) Prior Publication Data

US 2024/0369195 A1 Nov. 7, 2024

(30) Foreign Application Priority Data

Sep. 19, 2023 (CN) ......................... 202322556322.1
Apr. 10, 2024 (CN) ......................... 202420734413.1
Jun. 7, 2024 (CN) ......................... 202421296504.8

(51) Int. Cl.
*F21K 9/238* (2016.01)
*F21S 9/02* (2006.01)
(Continued)

(52) U.S. Cl.
CPC ................ *F21K 9/238* (2016.08); *F21S 9/02* (2013.01); *F21V 21/008* (2013.01);
(Continued)

(58) Field of Classification Search
CPC ...... F21V 23/005; F21V 23/009; F21V 23/04; F21V 23/0414; F21V 23/0492;
(Continued)

(56) References Cited

U.S. PATENT DOCUMENTS 11,187,387 B1 * 11/2021 Yan ......................... F21K 9/232
2007/0247840 A1 * 10/2007 Ham ......................... F21K 9/23
362/227

(Continued)

FOREIGN PATENT DOCUMENTS

CN 201487679 U * 5/2010
CN 211929486 U * 11/2020
CN 218455170 U * 2/2023 ............. F21K 9/232

OTHER PUBLICATIONS

Chen L, "LED Changeable Colour Temperature White Hollow Lamp", May 26, 2010, EPO Patent Translate of Description CN201487679U, 6 pages. (Year: 2010).*

(Continued)

*Primary Examiner* — Alan B Cariaso

(57) ABSTRACT

A multifunctional and variable lamp sheet and lamp are provided. A light-emitting diode (LED) multifunctional light-emitting assembly of the lamp sheet includes a light-emitting region and a control region; the light-emitting region is any geometric light-emitting shape; and the light-emitting style is divided into a plurality of sub-regions connected into the control region of the lamp sheet to perform partition control on the light-emitting region. The present disclosure has the beneficial effects: The structures of existing LED-molded lamp sheets and lamp bulbs are optimized. Meanwhile, LED chips with different light-emitting colors and a control single-chip microcomputer are added, so that when the control region inputs different control signals to the corresponding sub-regions, the lamp can emit light to achieve a dynamic water flowing effect and color changing and pattern changing effects.

12 Claims, 17 Drawing Sheets

(51) Int. Cl.

| | |
|---|---|
| ***F21V 21/008*** | (2006.01) |
| ***F21V 23/00*** | (2015.01) |
| ***F21V 23/04*** | (2006.01) |
| ***F21V 31/00*** | (2006.01) |
| ***F21W 121/00*** | (2006.01) |
| ***F21Y 105/12*** | (2016.01) |
| ***F21Y 113/13*** | (2016.01) |
| ***F21Y 113/17*** | (2016.01) |
| ***F21Y 115/10*** | (2016.01) |
| ***G09F 9/33*** | (2006.01) |

(52) U.S. Cl.
CPC .......... *F21V 23/005* (2013.01); *F21V 23/009* (2013.01); *F21V 23/04* (2013.01); *F21V 23/0414* (2013.01); *F21V 23/0492* (2013.01); *F21V 31/005* (2013.01); *G09F 9/33* (2013.01); *F21W 2121/00* (2013.01); *F21Y 2105/12* (2016.08); *F21Y 2113/13* (2016.08); *F21Y 2113/17* (2016.08); *F21Y 2115/10* (2016.08)

(58) Field of Classification Search
CPC .... F21V 17/162; F21V 31/005; F21V 21/008; F21K 9/238; F21Y 2107/00; F21Y 2113/17; F21Y 2115/10; F21Y 2113/13; G09F 9/33; F21S 9/02; F21S 9/022; F21W 2121/00; F21W 2121/004
See application file for complete search history.

(56) References Cited

U.S. PATENT DOCUMENTS

| | | | | |
|---|---|---|---|---|
| 2014/0029248 | A1 | 1/2014 | Dyson et al. | |
| 2014/0268697 | A1 * | 9/2014 | Smith | F21K 9/232 362/183 |
| 2020/0208787 | A1 | 7/2020 | Yang | |
| 2021/0045203 | A1 * | 2/2021 | Bayes | F21V 23/006 |
| 2022/0074563 | A1 | 3/2022 | Shimizu | |
| 2022/0290820 | A1 * | 9/2022 | Van Bommel | F21K 9/232 |
| 2023/0417377 | A1 * | 12/2023 | Ren | F21K 9/237 |

OTHER PUBLICATIONS

Deng Q et al., "Lens-type Full-colour LED Packaging Device", Nov. 13, 2020, EPO Patent Translate of "Description CN211929486U", 7 pages. (Year: 2020).*

Wang S, "A Flow Type Light Effect Bulb", Feb. 7, 2023, EPO Patent Translate of "Description CN218455170U", 8 pages. (Year: 2023).*

* cited by examiner

MULTIFUNCTIONAL AND VARIABLE LAMP SHEET AND LAMP

TECHNICAL FIELD

The present disclosure relates to the technical field of lighting, and in particular, to a multifunctional and variable lamp sheet and lamp.

BACKGROUND

In recent years, with the development of lighting with light-emitting diodes (LED), the demand for personalized lamps has grown rapidly. An LED filament lamp, as a type of lamp with a retro feature, has developed rapidly in its field. Personalized LED-shaped light-emitting lamp sheets are widely loved by consumers, and demands for personalization are increasingly high.

However, the existing technology platforms are difficult to unify, resulting in high processing cost. Meanwhile, the way of changing lighting is single and does not have sufficient waterproof performance, making it difficult to adapt to outdoor lighting environments. Therefore, it is very hard to apply this type of product to consumers' lighting market. This solution mainly optimizes the structures of the existing LED-shaped lamp sheets and the structures of existing lamp bulbs, and greatly saves the processing cost of this type of product. Moreover, by adding different LED light-emitting chips and a control single-chip microcomputer, the LED-shaped lamp sheet can have more color and function changes.

SUMMARY

(I) Technical Problem to be Solved

In view of the above shortcomings and defects in the prior art, the present disclosure provides a multifunctional and variable lamp sheet and lamp, solving the technical problem that an existing LED filament lamp has a single light-emitting function and can hardly meet the market requirement.

(II) Technical Solution

In order to achieve the above objectives, main technical solutions used by the present disclosure are as follows:

In a first aspect, the embodiments of the present disclosure provide a multifunctional and variable lamp sheet, applicable to an LED filament lamp, including: an LED multifunctional light-emitting assembly; the LED multifunctional light-emitting assembly includes a light-emitting region and a control region which are arranged on a transparent bracket; the light-emitting region includes several colored light-emitting chips and a light-emitting control element which are arranged on a light-emitting base plate; the light-emitting region is any geometric light-emitting shape and is provided with at least one sub-region; at least one colored light-emitting chip is arranged in the various sub-regions; and the various sub-regions are connected to the control region respectively through electric signals, so that the light-emitting region achieves various lighting changes.

In a second aspect, the embodiments of the present disclosure provide a multifunctional and variable lamp, including a lamp housing, a lamp base, and a multifunctional and variable lamp sheet, wherein the lamp base is detachably connected to the lamp housing; a driving bin is mounted in the lamp base; a switch control board and a rechargeable battery are arranged in the driving bin.

The lamp sheet is mounted in a cavity enclosed by the lamp base and the lamp housing; a grounding end of the LED multifunctional light-emitting assembly of the lamp sheet is mounted in the driving bin and is electrically connected to the switch control board; and a light-emitting end of the LED multifunctional light-emitting assembly is located in the lamp housing.

(III) Beneficial Effects

Beneficial effects of the present disclosure are as follows:

1. According to the multifunctional and variable lamp sheet of the present disclosure, the light-emitting region of the lamp sheet is set to any geometric light-emitting shape, and the light-emitting style is divided into the plurality of sub-regions connected into the control region of the lamp sheet to achieve the partition control on the light-emitting region. When the control region inputs different control signals to the corresponding sub-regions, the lighting of the lamp can achieve a dynamic water flowing effect and color changing and pattern changing effects. Compared with the prior art, the fun and observability of displaying of the lamp can be improved to adapt to more lighting scenarios, and the technical problem that the existing LED-shaped light-emitting lamp has a single lighting effect, so that it is hard for the existing LED-shaped light-emitting lamp to meet the needs of various application scenarios.

2. The light-emitting style is divided into a plurality of sub-regions that are connected to the control region of the lamp sheet. These sub-regions can be combined into various expression patterns such as "happy", "angry", "sad", "glad", and can also create various other pattern modes or LOGOs, which are more in line with a current actual lighting scenario during use and meet the personalized lighting need of people.

3. The switch control board and the rechargeable battery are mounted in the driving bin in the lamp base, and the LED multifunctional light-emitting assembly into a light-emitting region, a light-emitting supporting region, and a control region. Compared with the prior art, the present disclosure has the advantages that the structures of the existing LED-shaped lamp sheets and the structures of the existing lamp bulbs are optimized, and the processing cost of this type of product is greatly saved. Moreover, by adding LED chips with different light-emitting colors and a control single-chip microcomputer, the LED-shaped lamp sheet can have more color and function changes.

4. Compared with the prior art, using the waterproof kit to wrap around the lamp base to provide waterproof protection for the lamp base can improve the waterproof performance of the lamp, making the lamp more suitable for an outdoor suspension application scenario, so that the technical problem that the existing lamp bulb cannot be well suitable for the outdoor application scenario because of its poor waterproof effect.

DESCRIPTION OF REFERENCE NUMERALS

- 1: lamp housing;
- 2: LED multifunctional light-emitting assembly;
- 201: light-emitting region; 2011: colored light-emitting chip; 2012: light-emitting base plate; 2013: encapsulation colloid; 20131: first sub-region; 20132: second sub-region; 20133: third sub-region; 20134: fourth sub-region; 20135: fifth sub-region; 20136: sixth sub-region; 2014: light-emitting control element; 202: light-emitting supporting region; 203: control region; 2031: control single-chip microcomputer; 2032: control electronic element; 2033: driving wiring port;
- 3: driving bin; 301: driving bin upper cover; 302: driving bin lower cover;
- 4: lamp base;
- 5: switch control board;
- 6: rechargeable battery;
- 7: waterproof kit; 71: mounting chamber;
- 8: sling; and 81: hanging hole.

DETAILED DESCRIPTION OF THE EMBODIMENTS

To better understand the above technical solutions, exemplary embodiments of the present disclosure will be described in more detail below with reference to the accompanying drawings. Although the accompanying drawings show the exemplary embodiments of the present disclosure, it should be understood that the present disclosure can be implemented in various forms, and should not be limited to the embodiments stated herein. Rather, these embodiments are provided for understanding the present disclosure more clearly and thoroughly, and can completely transfer the scope of the present disclosure to those skilled in the art.

Embodiment 1

Figure 1:
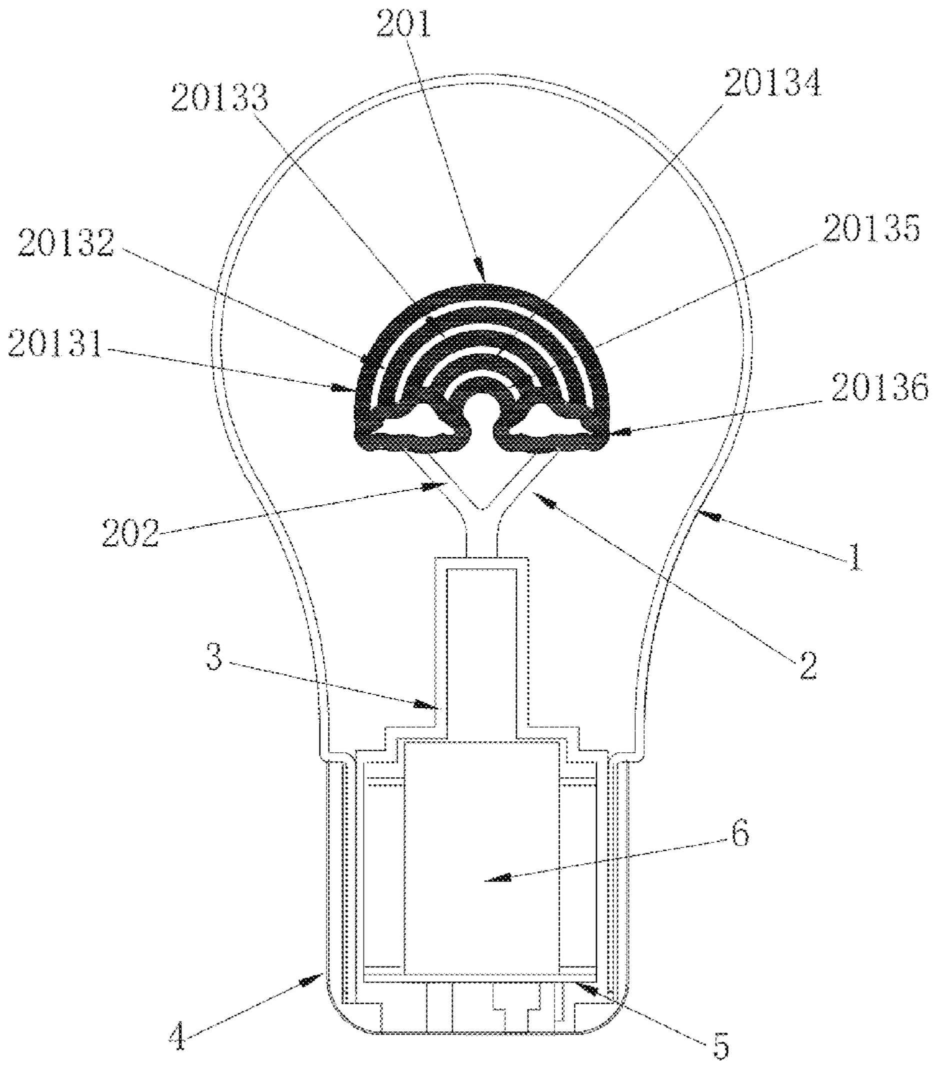
FIG. 1 is a perspective diagram of a lamp of Embodiment 1.

Referring to FIG. 1, Embodiment 1 provides a multifunctional and variable lamp sheet applicable to an LED filament lamp. The multifunctional and variable lamp sheet includes an LED multifunctional light-emitting assembly 2. The LED multifunctional light-emitting assembly 2 includes a light-emitting region 201 and a control region 203 which are arranged on a transparent bracket. The light-emitting region 201 includes six sub-regions. The various sub-regions are connected to the control region 203 respectively through electrical signals to achieve various lighting changes in the light-emitting region 201.

Figure 8:
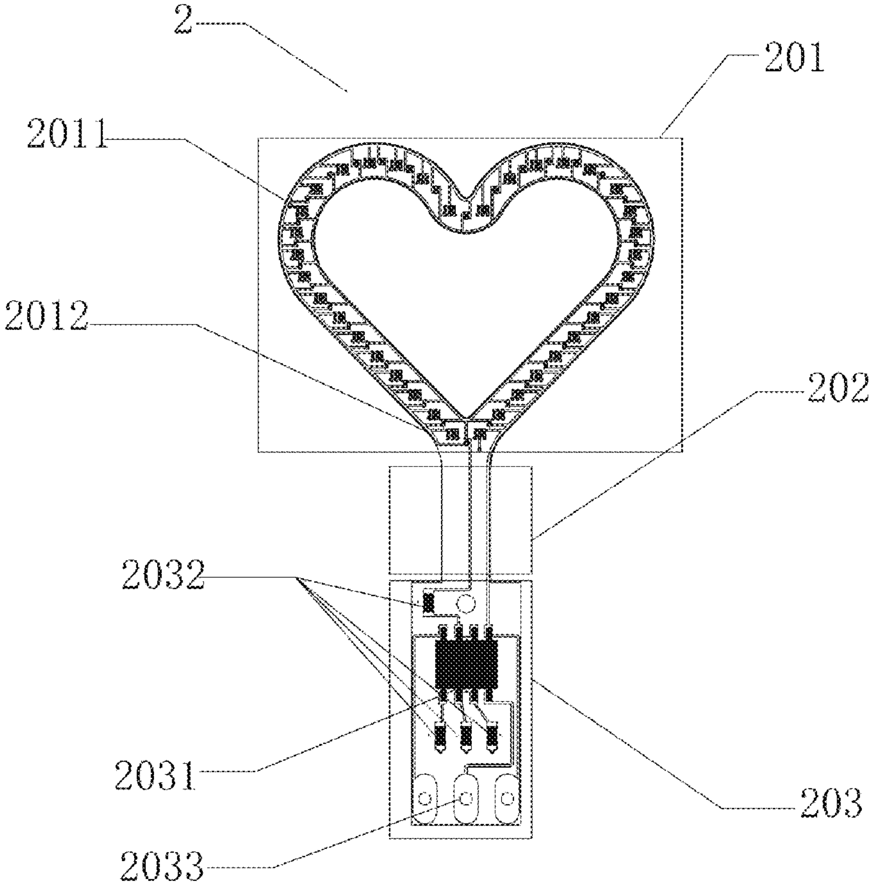
FIG. 8 is a schematic diagram of a front view of an LED multifunctional light-emitting assembly of Embodiment 5.
Figure 12:
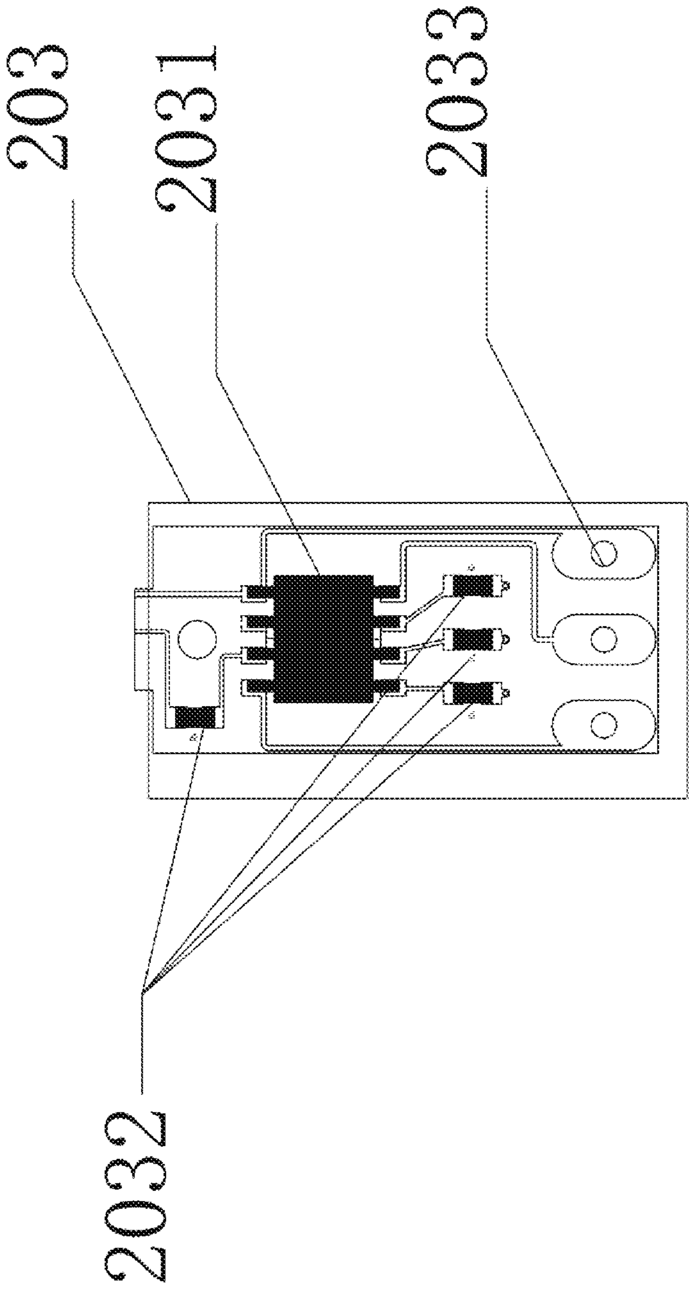
FIG. 12 is a schematic structural diagram of a control region of Embodiment 5.

Referring to FIG. 8 and FIG. 12, the control region 203 is provided with a control electronic element 2032 and/or a control single-chip microcomputer 2031, and a driving wiring port 2033. The control electronic element 2032 and the control single-chip microcomputer 2031 are combined with a control program to control changes of light-emitting colors, dynamic water flowing changes, a marquee effect, pattern changes, and on/off changes in the sub-regions, so that the display effect is better, and a better vision experience is provided for people. The control program is set in the control single-chip microcomputer 2031. The driving wiring port 2033 can be connected to a switch control board 5, a gravity switch, a vibration switch device, and a sensing device.

Referring to FIG. 1, the light-emitting shape of the light-emitting region 201 is a rainbow. The light-emitting shape is divided into a first sub-region 20131, a second sub-region 20132, a third sub-region 20133, a fourth sub-region 20134, a fifth sub-region 20135, and a sixth sub-region 20136 in sequence. The control electronic element 2032 or the control single-chip microcomputer 2031 is provided with corresponding connecting pins; and the various sub-regions are correspondingly connected to the connecting pins of the control electronic element 2032 or the control single-chip microcomputer 2031. Namely, the control electronic element 2032 or the control single-chip microcomputer 2031 performs partition control on the light-emitting shape. When the light-emitting region 201 emits light, the light of the various sub-regions does not interfere with each other. The various sub-regions receive control signals from the corresponding connecting pins of the control electronic element 2032 or the control single-chip microcomputer 2031 to emit light, so that the light of the light-emitting region 201 achieves a dynamic water flowing effect.

In an actual production application process, the light-emitting shape of the light-emitting region 201 can be set according to an actual need, and can be any geometric light-emitting shape. Different patterns and LOGOs can be personalized according to customers. The number of the sub-regions can be increased or decreased according to an actual situation. The light-emitting region 201 includes at least one sub-region. At least one colored light-emitting chip 2011 is arranged in the various sub-regions. The colored light-emitting chip 2011 includes but is not limited to red, green, and glue LED light-emitting chips.

As a feasible solution, the transparent bracket is further provided with a light-emitting supporting region 202 configured to connect the light-emitting region 201 to the control region 203. Due to the arrangement of the light-emitting supporting region 202, on the one hand, it is possible to achieve electrical and mechanical connections between the light-emitting region 201 and the control region 203, so that the light-emitting region 201 can be suspended in the LED filament lamp. On the second hand, it provides a large change space for the style and structure of the light-emitting region 201, so that more shapes can be formed, and the difficulty of production and assembling is low.

Embodiment 2

Figure 2:
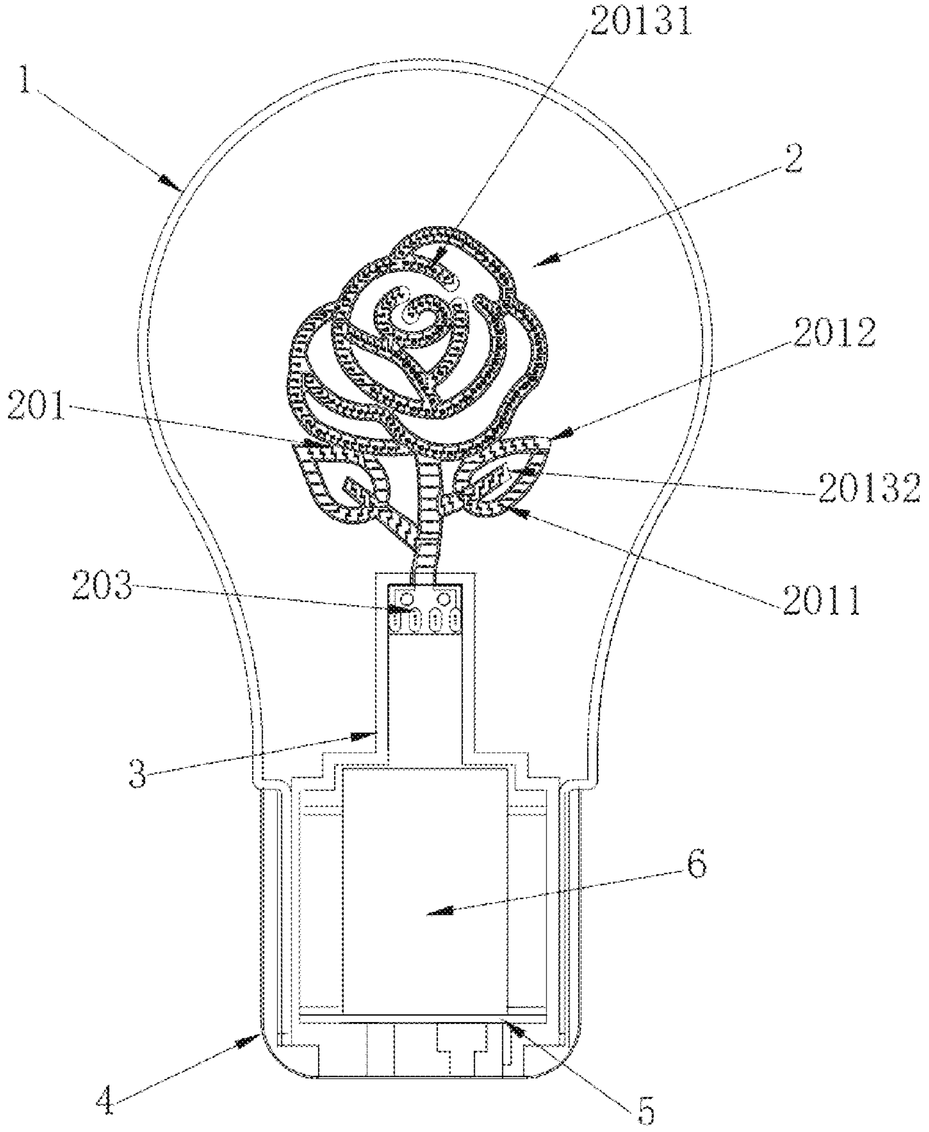
FIG. 2 is a perspective diagram of a lamp of Embodiment 2.

Referring to FIG. 2, unlike Embodiment 1, the light-emitting shape of the light-emitting region 201 in Embodiment 2 is a rose, including a first sub-region 20131 and a second sub-region 20132, without a light-emitting supporting region 202.

The two sub-regions respectively receive control signals from the connecting pins of the control electronic element 2032 or the control single-chip microcomputer 2031 to emit light, to change the colors of the light-emitting shapes and display roses in various colors.

Embodiment 3

Figure 3:
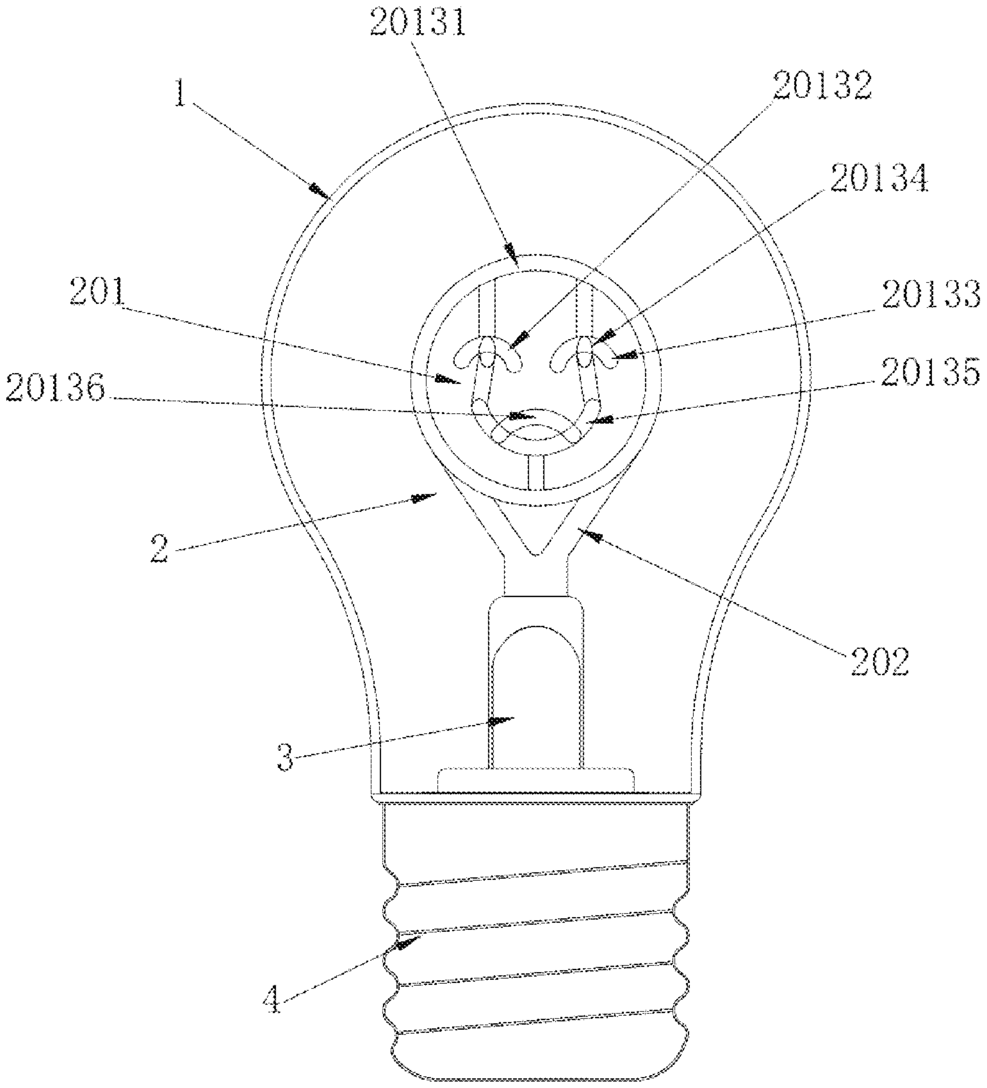
FIG. 3 is a schematic structural diagram of a lamp of Embodiment 3.

Referring to FIG. 3, unlike Embodiment 1, the light-emitting shape of Embodiment 3 is an expression pattern, including a first sub-region 20131, two second sub-regions 20132, two third sub-regions 20133, two fourth sub-regions 20134, a fifth sub-region 20135, and a sixth sub-region 20136.

Figure 4:
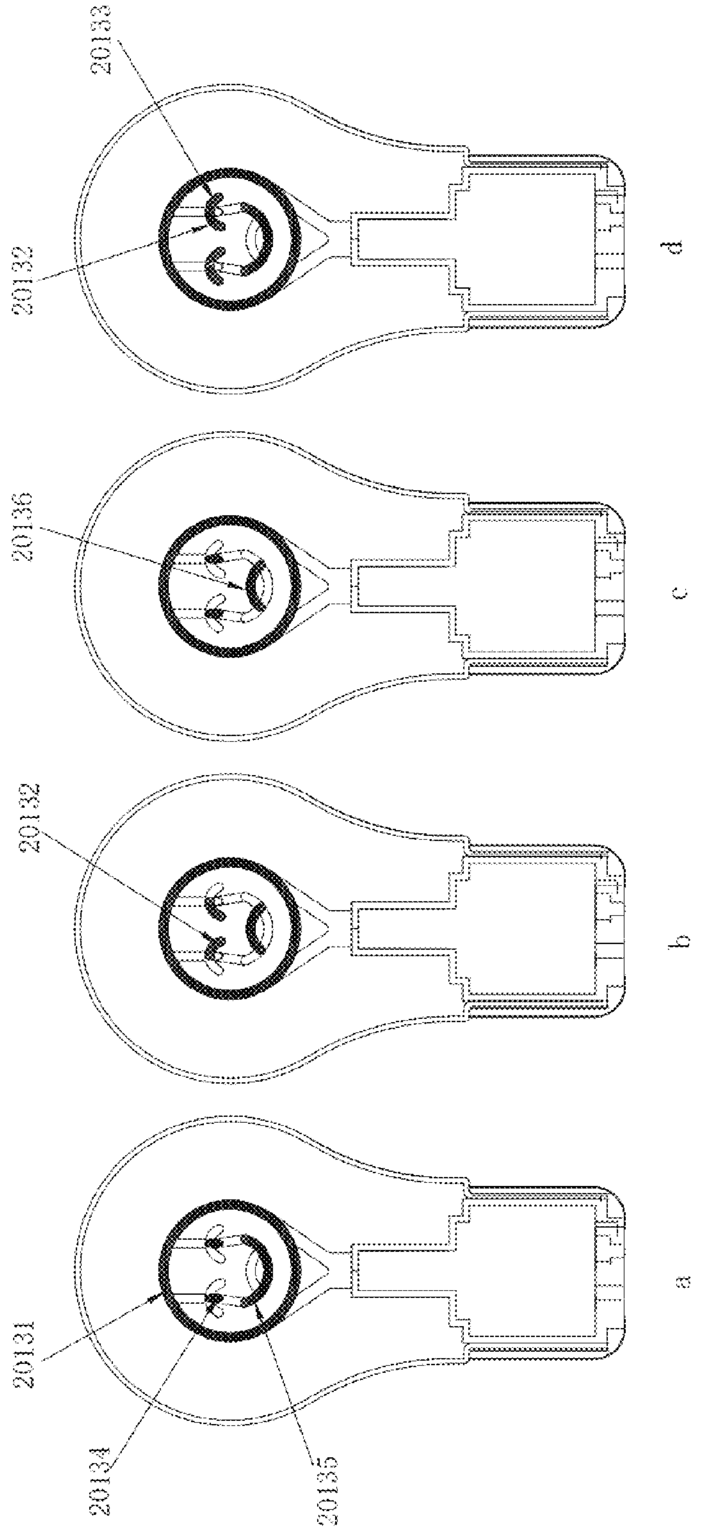
FIG. 4 is a schematic diagram of a light-emitting state of a lamp of Embodiment 3.

Referring to FIG. 3 and FIG. 4, the first sub-region 20131 is in a circular ring shape; the second sub-regions 20132 and the third sub-region 20133 are located at an upper part in the first sub-region 20131, are in a circular arc shape, and are able to be assembled into a circular arc; the fourth sub-regions 20134 are circular and correspond to positions between the second sub-regions 20132) and the third sub-region 20133; the fifth sub-region 20135 and the sixth sub-region 20136 are located at a lower part in the first sub-region 20131 and are in a circular arc shape, and the circular arcs have opposite openings. The lamp sheet may display different expression patterns when emitting light.

FIG. 4*a* shows that the first sub-region 20131, the fourth sub-regions 20134, and the fifth sub-region 20135 are lit up only, indicating expression "happy". FIG. 4*b* shows that the first sub-region 20131, the second sub-regions 20132, and the sixth sub-region 20136 are lit up only, indicating expression "angry". FIG. 4*c* shows that the first sub-region 20131, the fourth sub-regions 20134, and the sixth sub-region 20136 are lit up only, indicating expression "sad". FIG. 4*d* shows the first sub-region 20131, the second sub-regions 20132, the third sub-region 20133, and the fifth sub-region 20135 are lit up only, indicating expression "glad".

The light-emitting shape of this embodiment can be customized into various patterns or LOGOs by increasing or decreasing the number and forms of the sub-regions according to an actual need. LOGO here means a trademark or a brand mark.

Embodiment 4

Figure 5:
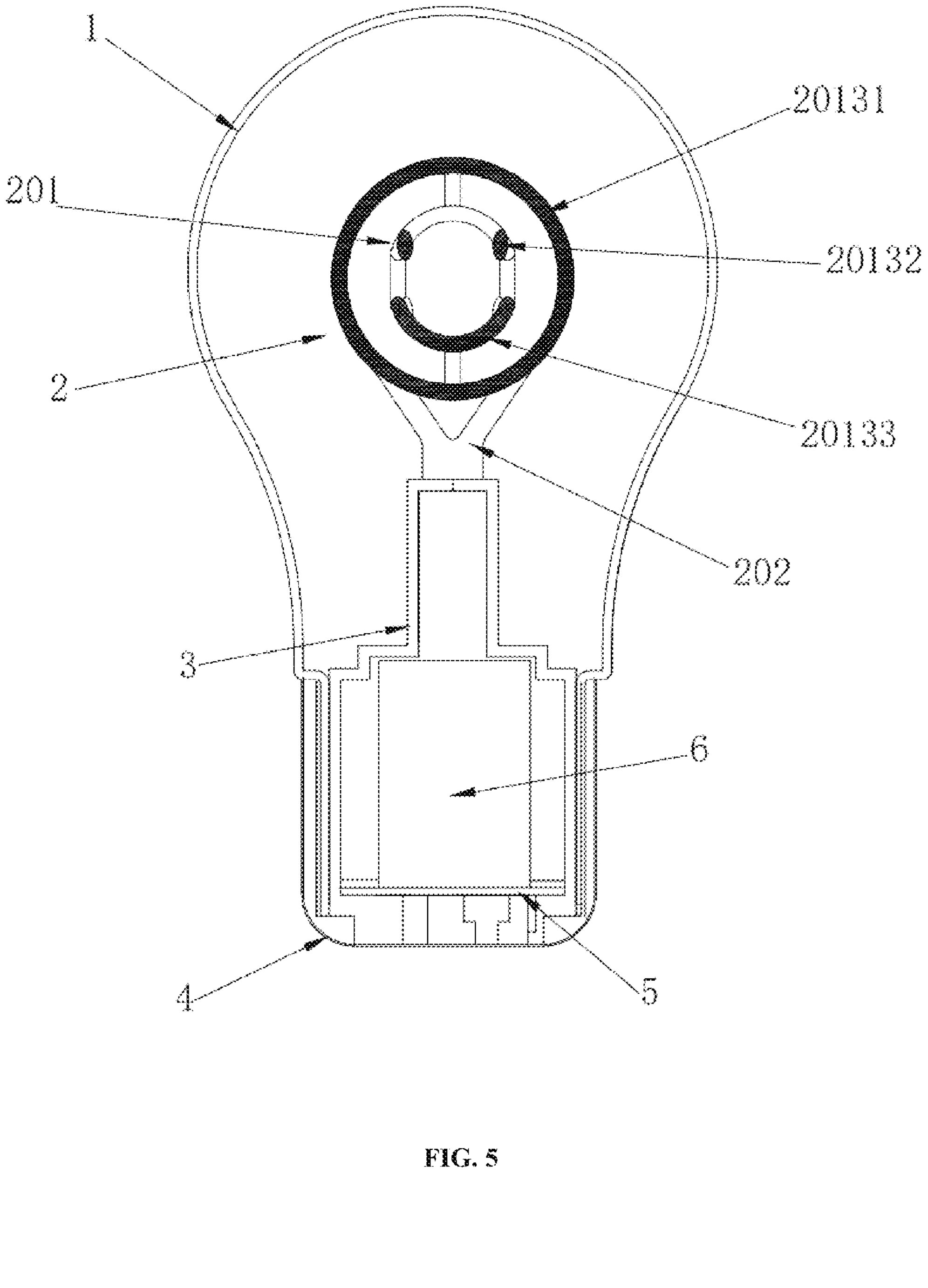
FIG. 5 is a schematic diagram of a forward placement state of a lamp of Embodiment 4.
Figure 6:
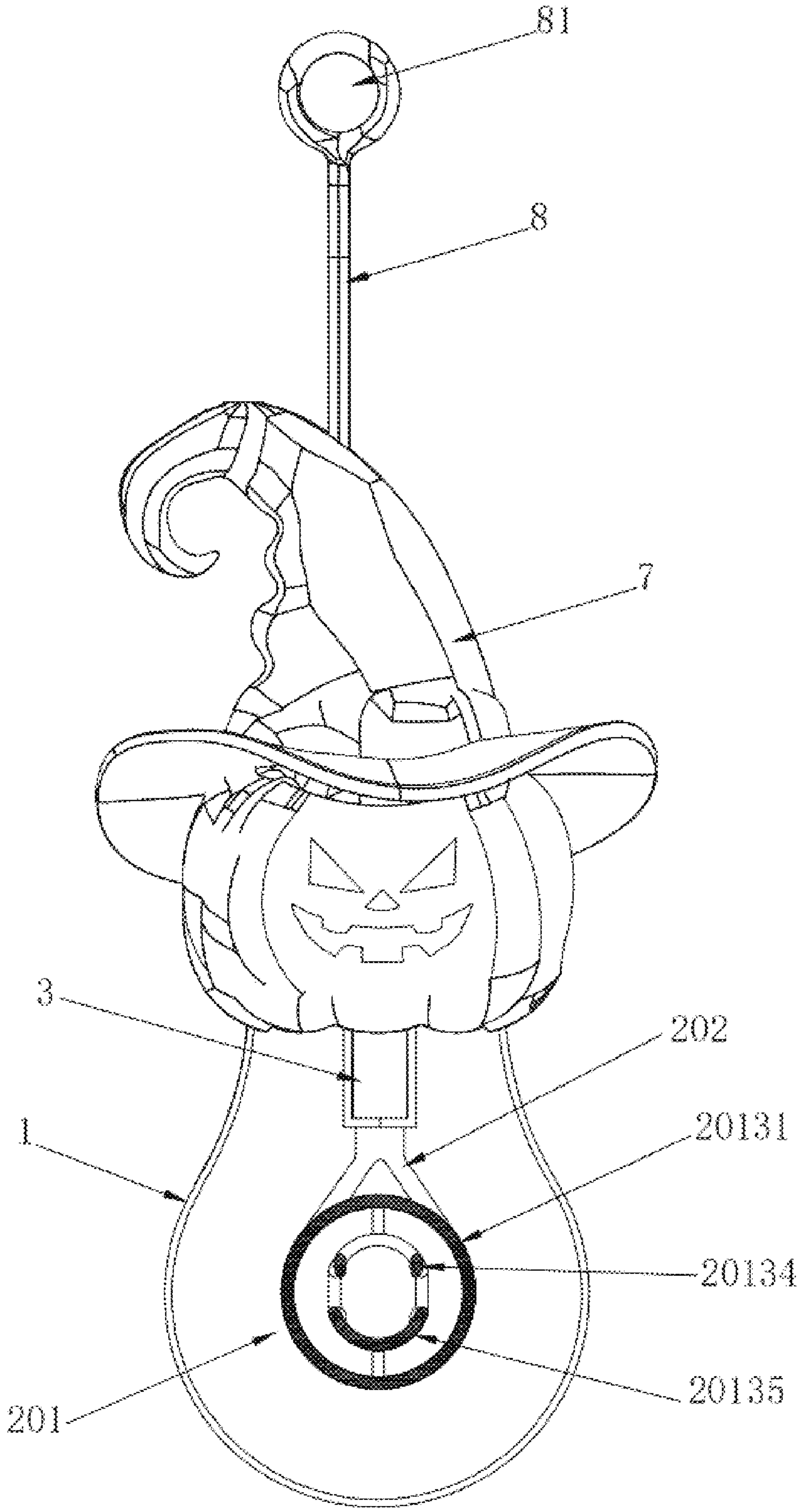
FIG. 6 is a schematic diagram of a suspended state of a lamp of Embodiment 4.

Referring to FIG. 5 and FIG. 6, based on Embodiment 3, a sensing device configured to sense changes of a placement mode of the lamp is arranged in the control region 203 or the lamp of Embodiment 4. The sensing device is the prior art, which is not shown in the figure. The light-emitting shape includes a circular-ring-shaped first sub-region 20131, two circular second sub-regions 20132, an arc-shaped third sub-region 20133, two circular fourth sub-regions 20134, and an arc-shaped fifth sub-region 20135. The entire light-emitting shape is transversely zygomorphic.

As shown in FIG. 5, when the lamp is placed upright, the control single-chip microcomputer 2031 in the control region 203 receives a position signal of the sensing device, converts the position signal into a control signal, and sends the control signal to the light-emitting region 201. The first sub-region 20131, the second sub-regions 20132, and the third sub-region 20133 are lit up, and the expression pattern is set upright at this time. On the contrary, when the lamp is suspended, the first sub-region 20131, the third sub-region 20133, and the fifth sub-region 20135 are lit up, keeping the expression pattern upright (as shown in FIG. 6). This design achieves that no matter the lamp is placed upright or is hung upside down, the expression pattern is always upright to be in line with the visual habit of a user.

Embodiment 5

Figure 7:
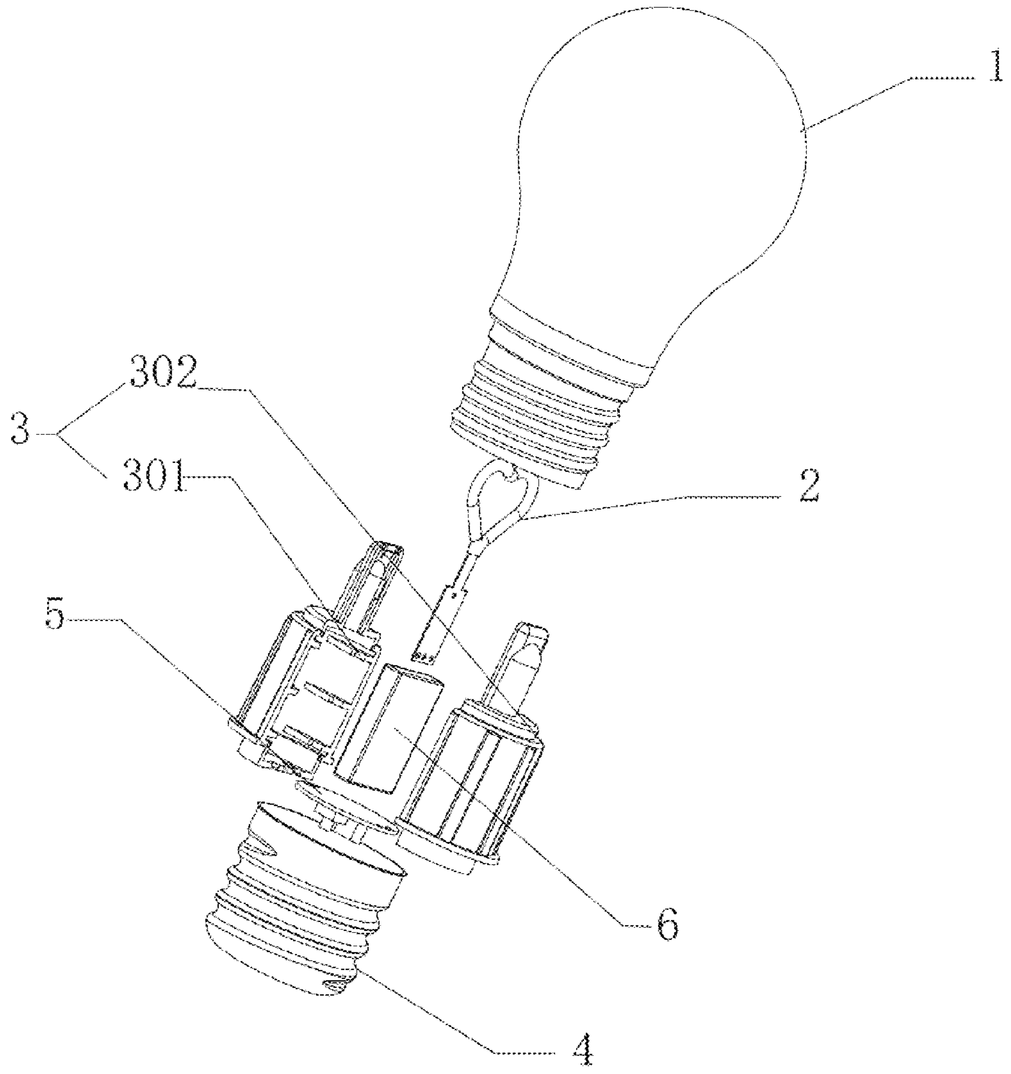
FIG. 7 is an exploded diagram of a lamp of Embodiment 5.
Figure 10:
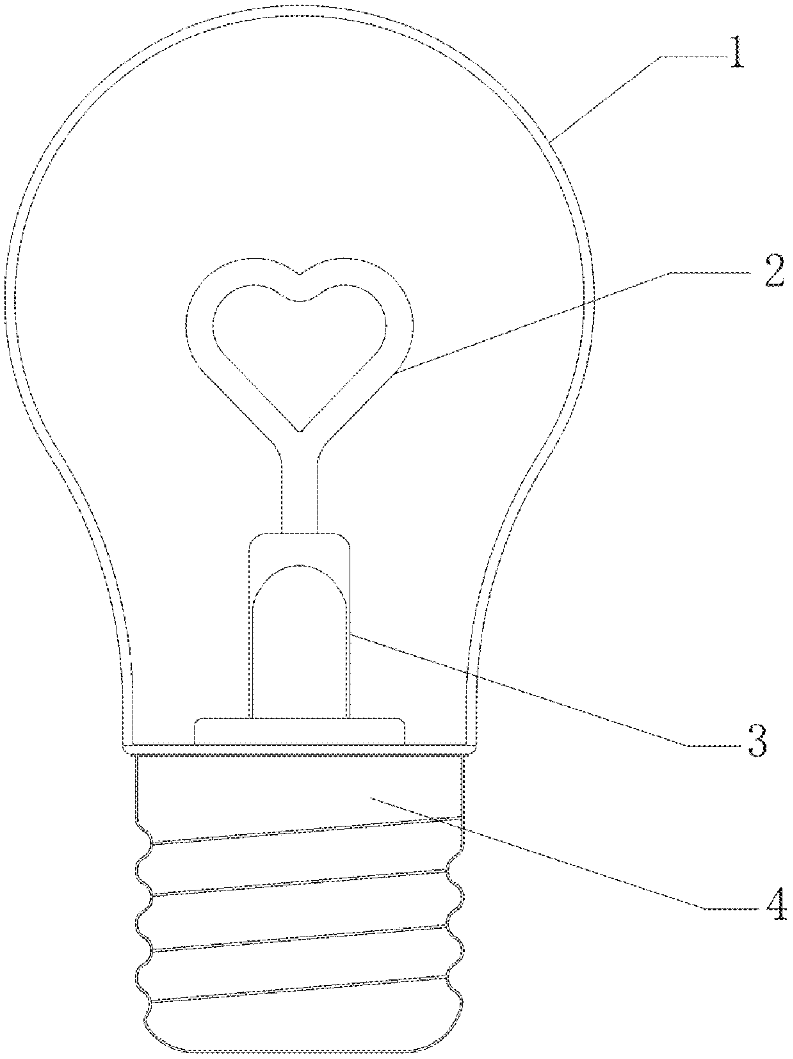
FIG. 10 is a schematic diagram of a front view of a multifunctional lamp of Embodiment 5.

Referring to FIG. 7 and FIG. 10, Embodiment 5 provides a multifunctional and variable lamp, including a lamp housing 1, an LED multifunctional light-emitting assembly 2, a driving bin 3, and a lamp base 4. The lamp base 4 is connected to the detachable lamp housing 1; the detachable driving bin 3 is arranged at a bottom of an inner chamber of the lamp base 4; a switch control board 5 is arranged in the driving bin 3. A rechargeable battery 6 is arranged in the driving bin 3 and located above the switch control board 5. A grounding end of the LED multifunctional light-emitting assembly 2 is mounted in the driving bin 3, and a light-emitting end of the LED multifunctional light-emitting assembly 2 is located in the lamp housing 1.

Referring to FIG. 8, a light-emitting region 201, a light-emitting supporting region 202, and the control region 203 of the LED multifunctional light-emitting assembly 2 are arranged on a transparent bracket and are all of integrated structures. In practical applications, they may be of non-integrated structures. The integration of the light-emitting region 201 and the control region 203 makes wiring easier, greatly reducing the production cost.

The light-emitting supporting region 202 is self-supported in an LED filament lamp, without a stem or a bracket, and electrical connection is ensured.

The driving bin 3 is arranged in the lamp base 4, can accommodate the switch control board 5 and the rechargeable battery 6, and can be configured to mount and fix the LED multifunctional light-emitting assembly 2. The LED multifunctional light-emitting assembly 2 is provided with the light-emitting region 201, the light-emitting supporting region 202, and the control region 203, so that the lamp is more compact in structure; the difficulty of production and processing is lower; and the production and processing costs are greatly reduced.

Figure 9:
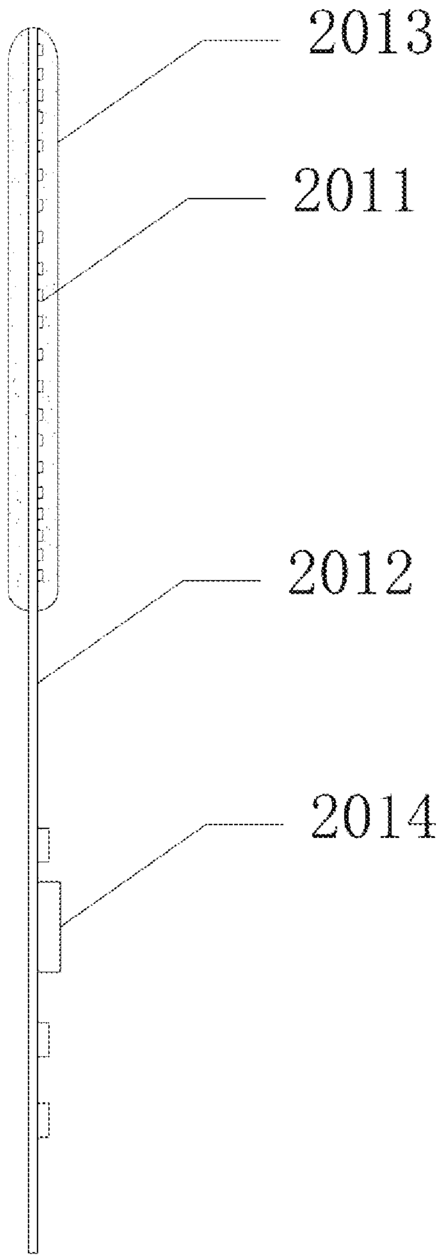
FIG. 9 is a schematic diagram of a side view of a light-emitting region of Embodiment 5.
Figure 11:
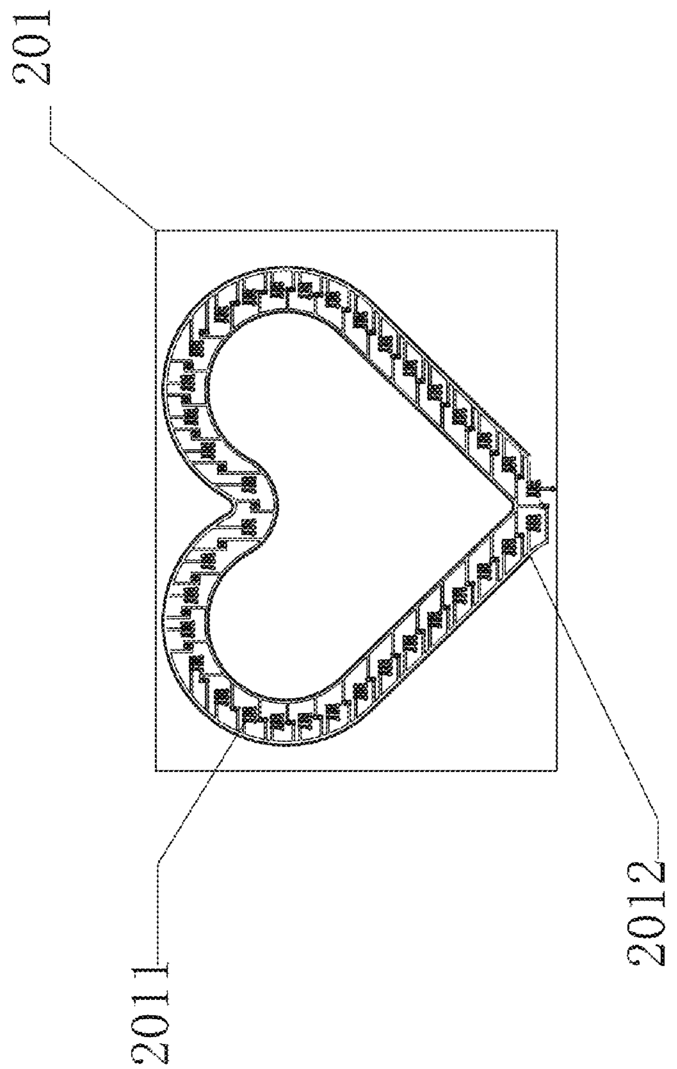
FIG. 11 is a schematic structural diagram of a light-emitting region of Embodiment 5.

Referring to FIG. 9 and FIG. 11, the light-emitting region 201 is formed by geometrically arranging different colored light-emitting chips 2011 on the light-emitting base plate 2012. Front and back surfaces of the colored light-emitting chips 2011 are coated with a layer of encapsulation colloid 2013 configured to encapsulate the colored light-emitting chips 2011. A light-emitting control element 2014 is arranged on the light-emitting base plate 2012.

Referring to FIG. 7, as a feasible solution, the lamp base 4 is made of stainless steel or nickel-plated metal. A single power switch button configured to switch a power supply switch and a light-emitting function mode is arranged at a bottom of the lamp base 4. A gravity switch device is arranged at an inner bottom of the lamp base 4. The gravity switch device configured to change light-emitting colors and function modes by picking up or putting down the lamp is arranged in the lamp base 4 and is located at a position corresponding to the bottom of the driving bin 3. The switch control board 5 is electrically connected to the rechargeable battery 6, the colored light-emitting chips 2011, the control single-chip microcomputer 2031, the control electronic element 2032, the driving wiring port 2033, the gravity switch device, the single power switch button, and the light-emitting control element 2014.

The gravity switch device and the single power switch button are two side-by-side independent switches, both of which can control light emission of the lamp, making use convenient. The single power switch button is mainly configured to: control on and off of a power supply and achieve manual switching of light-emitting function modes. When there is a change in the gravity, the gravity switch device acquires the gravity change and transmits the gravity change to the control single-chip microcomputer 2031. The control single-chip microcomputer 2031 converts the change into a control signal and transmits the control signal to the light-emitting region 201 to correspondingly change the light-emitting colors and function modes.

In practical applications, the gravity switch device can be replaced with a vibration switch device. The vibration switch device acquires vibration information and transmit the vibration information to the control single-chip microcomputer 2031. The control single-chip microcomputer 2031 converts the information into a control signal and transmits the control signal to the light-emitting region 201 to change the light-emitting colors and function modes. Due to the arrangement of the gravity switch device or the vibration switch device, a user can switch the light-emitting colors and function modes by shaking the lamp. It is more interesting.

As a feasible solution, the colored light-emitting chips 2011 emit warm white light, red light, green light, blue light, and white light, or may emit light in other colors. The encapsulation colloid 2013 is milk white colloid. The colored light-emitting chips 2011 are LED chips. The lamp housing 1, the LED multifunctional light-emitting assembly 2, the driving bin 3, and the lamp base 4 form an LED-shaped filament lamp; and a placement mode of the LED-shaped filament lamp includes flat placement or suspension to adapt to move application scenarios. The flat placement means upright placement.

Referring to FIG. 9, as a feasible solution, the light-emitting base plate 2012 is an integrated transparent bracket. The bracket is provided with two or more layers of circuits for electrical connection. The transparent bracket is made of one of ceramic, glass, sapphire or a transparent PCB, and a material of the light-emitting supporting region 202 is the same as that of the transparent bracket.

Referring to FIG. 7, as a feasible solution, the driving bin 3 is of a cylindrical structure composed of a driving bin upper cover 301 and a driving bin lower cover 302. Matching clamping slots are provided at positions, corresponding to the switch control board 5 and the rechargeable battery 6, in the driving bin 3. The switch control board 5 and the rechargeable battery 6 are clamped into the corresponding clamping slots, and can be directly structurally matched with the lamp housing 1 to facilitate assembling of a lamp bulb. The driving bin 3 and the lamp housing 1 are both made of plastic, so that they are not easy to damage.

In an actual production application process, there are no restrictions on the materials of the lamp housing 1, the driving bin 3, and the lamp base 4.

As a feasible solution, the switch control board 5 includes a switch circuit, a charging circuit, and a driving circuit; and the switch circuit, the charging circuit, and the driving circuit are respectively controlled by various electronic elements.

The switch circuit is configured to control turning on and turning off of the lamp. The charging circuit is configured to charge the rechargeable battery 6. The driving circuit is configured to drive the colored light-emitting chips 2011 to emit light.

By the use of the multifunctional and variable lamp designed in this solution, the colored light-emitting chips 2011 with more light-emitting colors and the control single-chip microcomputer 2031 are arranged in an LED-shaped light-emitting lamp sheet. When the colored light-emitting chips 2011 are combined with a program of the control single-chip microcomputer 2031, colors and functions can be randomly changed. Furthermore, the control single-chip microcomputer 2031 and the colored light-emitting chips 2011 are combined into a whole, so that the cost of the wiring process is greatly saved.

Embodiment 6

Figure 13:
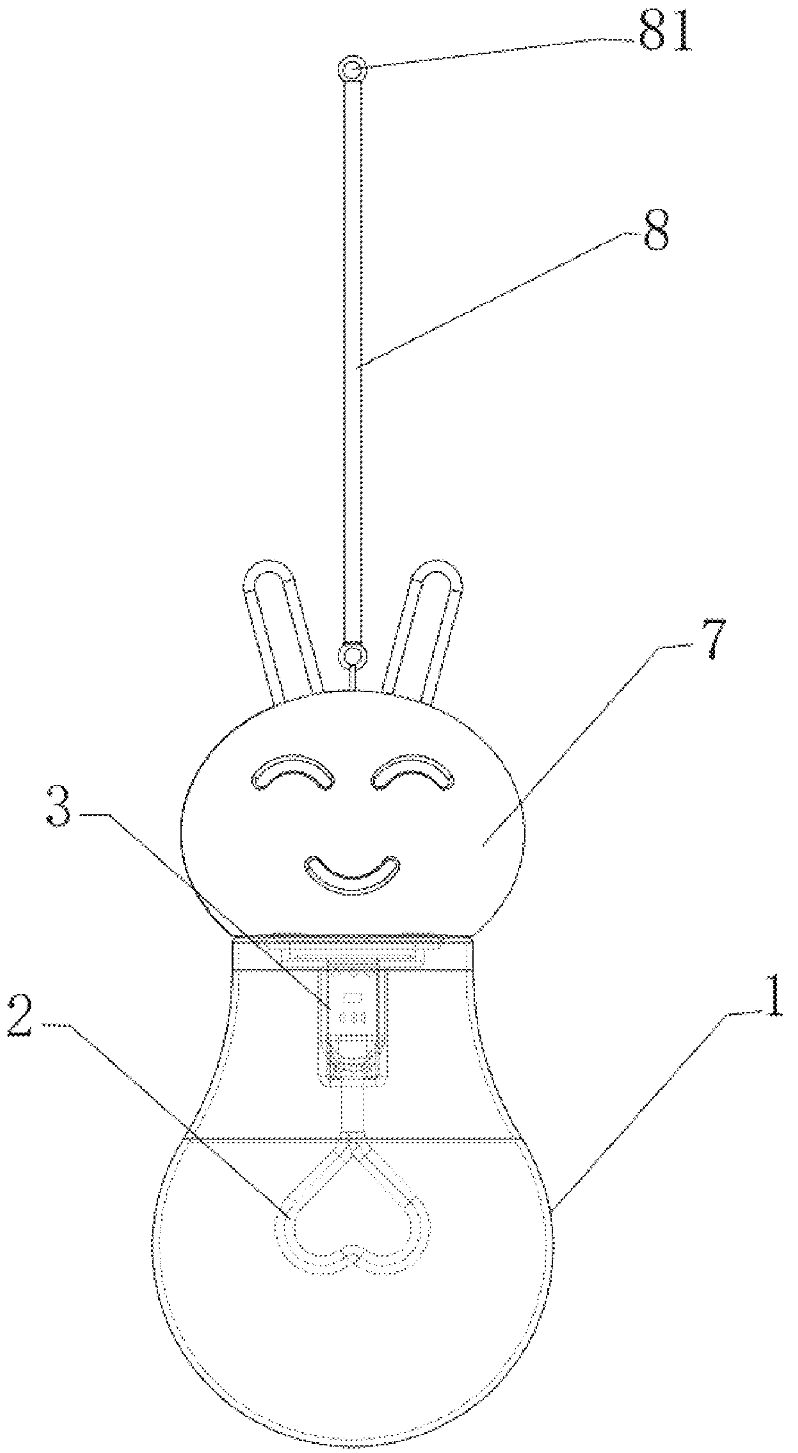
FIG. 13 is a schematic diagram I of a front view of a multifunctional lamp of Embodiment 6.

Referring to FIG. 13, based Embodiment 5, the lamp further includes a waterproof kit 7 and a sling 8 connected to the waterproof kit 7.

Figure 14:
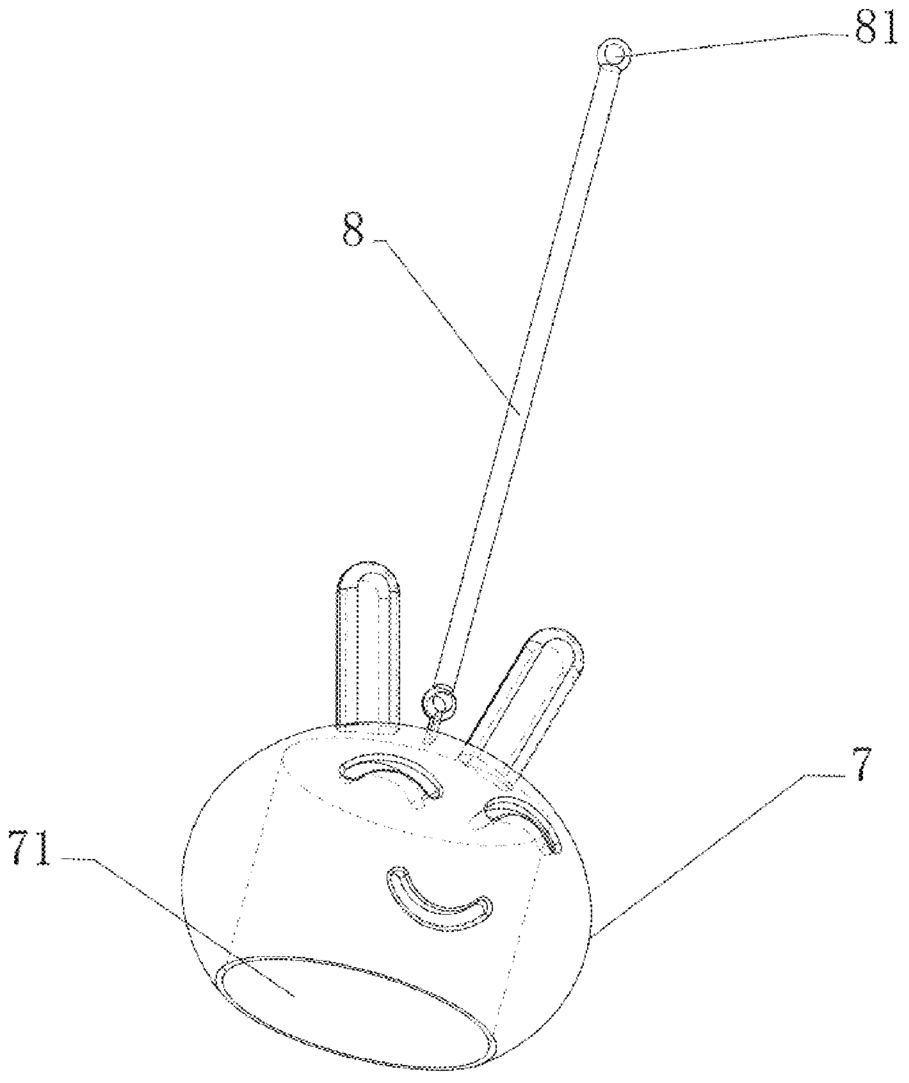
FIG. 14 is a three-dimensional diagram of a waterproof kit of Embodiment 6.

Referring to FIG. 14, the waterproof kit 7 is provided with a mounting chamber 71 matched with the lamp base 4; the mounting chamber 71 is in close fit with an outer surface of the lamp base 4, so that the waterproof kit 7 wraps around the lamp base 4 to provide waterproof protection for the lamp base 4.

In practical applications, a material of the waterproof kit 7 is not limited, and can be a soft rubber material, a hard rubber material, or other materials that can be used in conjunction with the lamp base 4 to achieve waterproofing. When the waterproof kit 7 is made of the soft rubber material, such as silica gel, the waterproof kit 7 tightly wraps around the lamp base 4 due to its own material. When the waterproof kit 7 is made of the hard adhesive material, the waterproof kit 7 can be connected to the lamp base 4 in a threaded connection way, a clamping way, or another detachable way.

It should be noted that the waterproof kit 7 is detachably connected to the lamp base 4, making it convenient to disassemble the waterproof kit 7 to charge the lamp.

Referring to FIG. 13, the waterproof kit 7 is in any 3D cartoon shape, which is more beautiful and interesting.

The waterproof kit 7 is used to wrap around the lamp base 4. There is a larger changing space for the shape and style of the waterproof kit 7, which not only achieves a waterproof effect, but also achieves decoration and beautification.

Referring to FIG. 10 and FIG. 13, the lamp housing 1 and the lamp base 4 are detachably connected together to form a light-emitting chamber. The control region 203 of the LED multifunctional light-emitting assembly 2 is mounted in the lamp base 4, and the light-emitting region 201 is connected to the control region 203, to achieve conduction of power and signals. Furthermore, the light-emitting region 201 is suspended in the light-emitting chamber. The light-emitting region 201 can be an LED light-emitting filament.

The rechargeable battery 6 can be arranged either internally or externally, thus achieving higher flexibility. When arranged internally, the rechargeable battery 6 is mounted in the driving bin 3. When arranged externally, the rechargeable battery 6 is mounted in a space enclosed by the waterproof kit 7 and the lamp base 4, and is connected to the lamp through a power cable to supply power to the LED multifunctional light-emitting assembly 2.

After the arrangement of the waterproof kit 7, in addition to arranging the rechargeable battery 6 internally, the rechargeable battery 6 can be further mounted in a space between the waterproof kit 7 and the lamp base 4, so that the arrangement is more flexible.

In practical applications, the lamp can be either a rechargeable lamp bulb or non-rechargeable lamp bulb.

Figure 15:
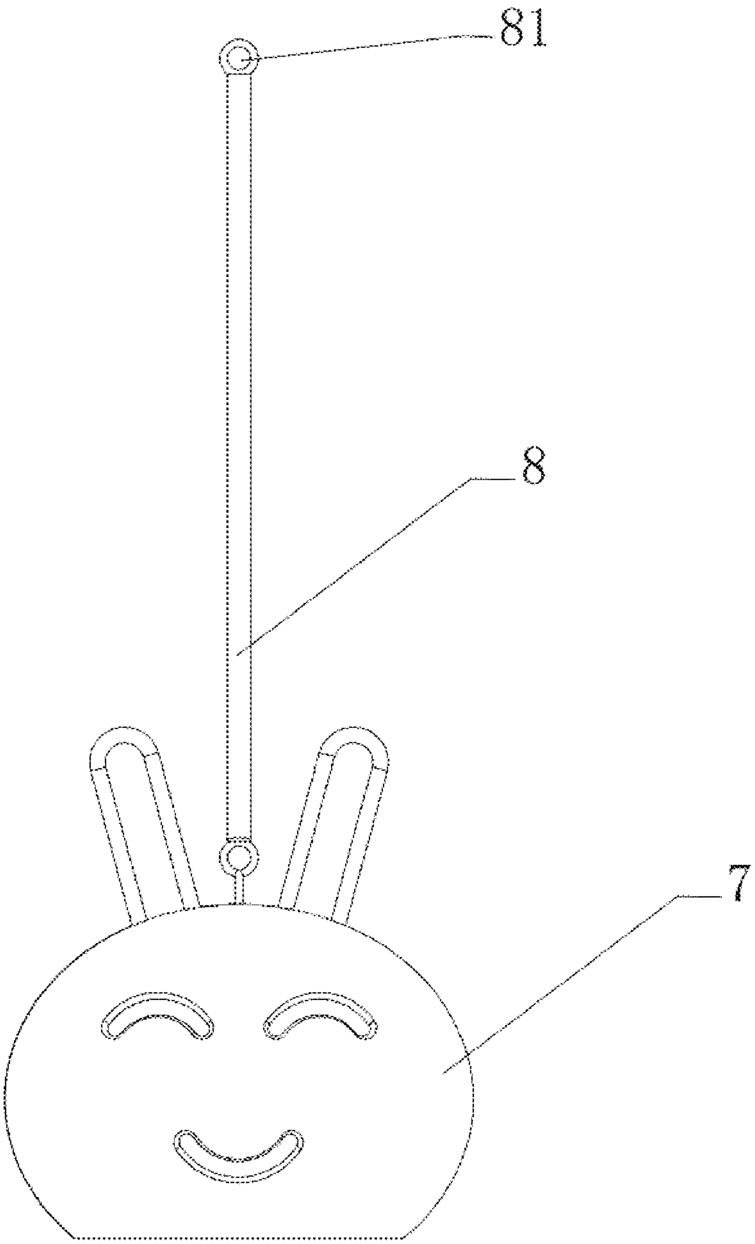
FIG. 15 is a schematic diagram of a front view of a waterproof kit of Embodiment 6.

Referring to FIG. 13 to FIG. 15, the sling 8 is integrally formed with the waterproof kit 7, or a connection position is arranged at a top of the waterproof kit 7. A lower end of the sling 8 passes through the connection position and is connected to the waterproof kit 7. The connection position can be a lifting ring or a through hole.

Referring to FIG. 14, a free end of the sling 8 is enlarged and is provided with an annular hanging hole 81, so that the lamp can be hung on an object such as a support and a tree branch through the sling 8, or can be easily grasped in the hand of a user, so as to adapt to more application scenarios.

Since the waterproof kit 7 is used to wrap around the lamp base 4 to provide the waterproof protection for the lamp base 4, rainwater is prevented from entering the lamp from a charging port of the lamp base 4 or a gap. The waterproof performance of the lamp can be improved, and the lamp is more applicable to an application scenario of outdoor hanging.

Figure 16:
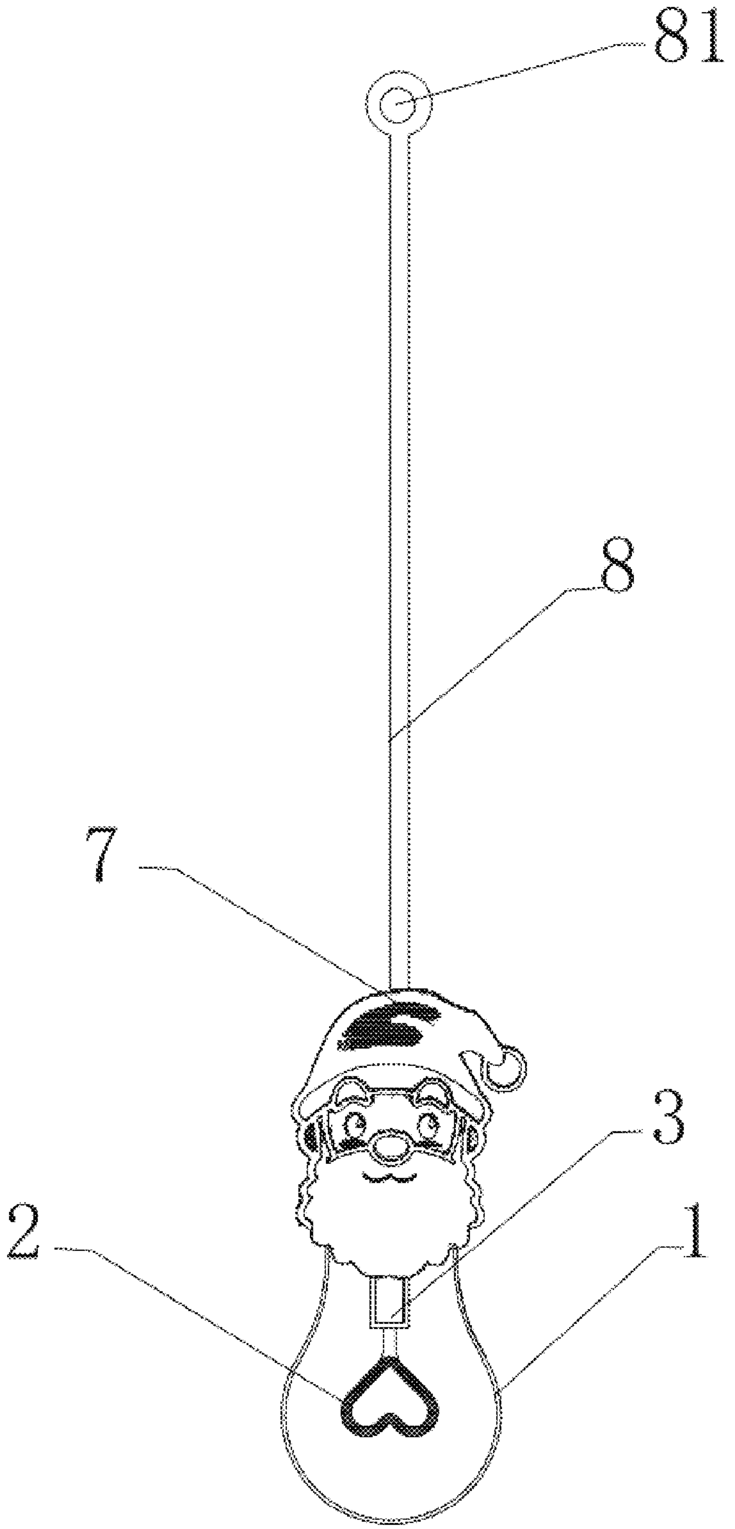
FIG. 16 is a schematic diagram II of a front view of a multifunctional lamp of Embodiment 6.
Figure 17:
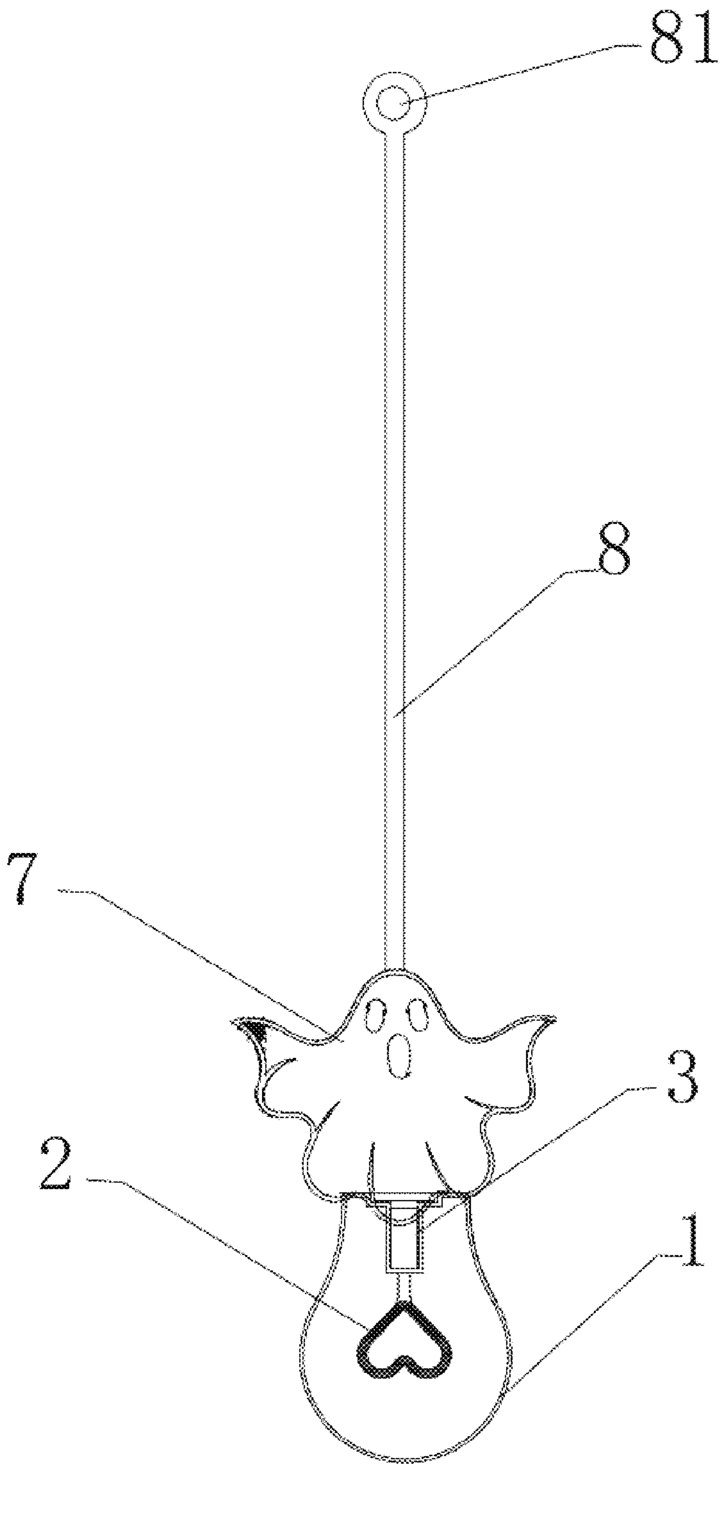
FIG. 17 is a schematic diagram III of a front view of a multifunctional lamp of Embodiment 6.

Referring to FIG. 16 to FIG. 17, in practical applications, the shape of the waterproof kit 7 can be changed to make the lamp more interesting and aesthetically pleasing.

In the description of the present disclosure, it should be understood that the terms "first" and "second" are used for descriptive purposes only and are not to be construed as indicating or implying relative importance or to implicitly indicate the number of technical features indicated. Thus, features defined as "first" and "second" explicitly or implicitly include one or more of the features. In the description of this disclosure, "plurality" means two or more, unless otherwise expressly and specifically defined.

The embodiments of the present disclosure have been shown and described above, but it can be understood that the above embodiments are exemplary and cannot be understood as limitations on the present disclosure. A person of ordinary skill in the art may make changes, modifications, substitutions, and transformations to the above embodiments within the scope of the present disclosure.

What is claimed is:

1. A multifunctional and variable lamp sheet, applicable to a light-emitting diode (LED) filament lamp, comprising an LED multifunctional light-emitting assembly (2), wherein the LED multifunctional light-emitting assembly (2) comprises a light-emitting region (201) and a control region (203) which are arranged on a transparent bracket; the light-emitting region (201) comprises several colored light-emitting chips (2011) and a light-emitting control element (2014) which are arranged on a light-emitting base plate (2012); the light-emitting region (201) is any geometric light-emitting shape and is provided with at least two sub-regions; at least one colored light-emitting chip (2011) is arranged in each sub-region; and the at least two sub-regions are connected to the control region (203) respectively through electric signals, so that the light-emitting region (201) achieves various lighting changes;

wherein the at least two sub-regions comprise a first sub-region (20131), two second sub-regions (20132), two third sub-regions (20133), two fourth sub-regions (20134), a fifth sub-region (20135), and a sixth sub-region (20136);

the first sub-region (20131) is in a circular ring shape; the second sub-regions (20132) and the third sub-region (20133) are located at an upper part in the first sub-region (20131), are in a circular arc shape, and are able to be assembled into a circular arc; the fourth sub-regions (20134) are circular and correspond to positions between the second sub-regions (20132) and the third sub-region (20133); the fifth sub-region (20135) and the sixth sub-region (20136) are located at a lower part in the first sub-region (20131) and are in a circular arc shape, and the circular arcs have opposite openings; and the at least two sub-regions receive a control signal to display different patterns in the light-emitting region (201) during light emission.

2. The multifunctional and variable lamp sheet according to claim 1, wherein a control electronic element (2032) and/or a control single-chip microcomputer (2031) are arranged in the control region (203);

the sub-regions are correspondingly connected to connecting pins of the control electronic element (2032) or the control single-chip microcomputer (2031) in sequence; and the sub-regions receive a control signal from the control electronic element (2032) or the control single-chip microcomputer (2031) to emit light, so that the lighting of the light-emitting region (201) achieves a dynamic water flowing effect, color changing, or light-emitting pattern changing.

3. The multifunctional and variable lamp sheet according to claim 2, wherein the colored light-emitting chips (2011) comprise a warm white LED chip, a red LED chip, a green LED chip, a blue LED chip, and a white LED chip; front and back surfaces of the colored light-emitting chips (2011) are coated with encapsulation colloid (2013); the encapsulation colloid (2013) is milk white colloid; and the transparent bracket is further provided with a light-emitting supporting region (202) configured to connect the light-emitting region (201) to the control region (203).

4. The multifunctional and variable lamp sheet according to claim 1, wherein the lamp sheet further comprises a sensing device arranged in a control region (203) and configured to sense changes in a lamp arrangement mode; when the lamp is placed upright, the control region (203) receives a position signal of the sensing device, converts the position signal into a control signal, and sends the control signal to the light-emitting region (201), so that expression patterns are displayed upright; and on the contrary, when the lamp is suspended, the control region (203) receives a corresponding position signal, converts the position signal into a control signal, and sends the control signal to the light-emitting region (201), so that expression patterns adaptively change to remain displayed upright.

5. A multifunctional and variable lamp, comprising a lamp housing (1), a lamp base (4), and a multifunctional and variable lamp sheet, wherein the lamp base (4) is detachably connected to the lamp housing (1); a driving bin (3) is mounted in the lamp base (4); a switch control board (5) and a rechargeable battery (6) are arranged in the driving bin (3);

the lamp sheet comprises an LED multifunctional light-emitting assembly (2); the LED multifunctional light-emitting assembly (2) comprises a light-emitting region (201) and a control region (203) which are arranged on a transparent bracket; the light-emitting region (201)

comprises several colored light-emitting chips (2011) and a light-emitting control element (2014) which are arranged on a light-emitting base plate (2012); the light-emitting region (201) is any geometric light-emitting shape and is provided with at least one sub-region; at least one colored light-emitting chip (2011) is arranged in at least one sub-region; the at least one sub-region is connected to the control region (203) respectively through electric signals, so that the light-emitting region (201) achieves various lighting changes;

the lamp sheet is mounted in a cavity enclosed by the lamp base (4) and the lamp housing (1); a grounding end of the LED multifunctional light-emitting assembly (2) of the lamp sheet is mounted in the driving bin (3) and is electrically connected to the switch control board (5); and a light-emitting end of the LED multifunctional light-emitting assembly (2) is suspended in the lamp housing (1).

6. The multifunctional and variable lamp according to claim 5, wherein the switch control board (5) comprises a switch circuit, a charging circuit, and a driving circuit;

the switch circuit, the charging circuit, and the driving circuit are respectively controlled by various electronic elements;

a single power switch button configured to switch a power supply switch and a light-emitting function mode is arranged at a bottom of the lamp base (4);

a gravity switch device is arranged at an inner bottom of the lamp base (4); the gravity switch device transmits gravity difference information caused by picking up or putting down the lamp to the control single-chip microcomputer (2031) of the control region (203) and converts the gravity difference information into a control signal to change light-emitting colors and function modes; the switch control board (5) is electrically connected to the rechargeable battery (6), the LED multifunctional light-emitting assembly (2), the single power switch button, and the gravity switch device, respectively;

or, a vibration switch device is arranged at an inner bottom of the lamp base (4); the vibration switch device transmits vibration information of the lamp to the control single-chip microcomputer (2031) and converts the vibration information into a control signal to change light-emitting colors and function modes; and the switch control board (5) is electrically connected to the rechargeable battery (6), the LED multifunctional light-emitting assembly (2), the single power switch button, and the vibration switch device, respectively.

7. The multifunctional and variable lamp according to claim 5, wherein the lamp housing (1), the LED multifunctional light-emitting assembly (2), the driving bin (3), and the lamp base (4) form an LED-shaped filament lamp; and a placement mode of the LED-shaped filament lamp comprises flat placement or suspension.

8. The multifunctional and variable lamp according to claim 7, wherein when the lamp is suspended, the lamp further comprises a waterproof kit (7) and a sling (8) connected to the waterproof kit; the waterproof kit (7) wraps around the lamp base (4) and is detachably connected to the lamp base (4); and the rechargeable battery (6) is mounted in the driving bin (3) or in a space enclosed by the waterproof kit (7) and lamp base (4).

9. The multifunctional and variable lamp according to claim 8, wherein the waterproof kit (7) is in a 3D cartoon shape; the waterproof kit (7) is provided with a mounting chamber (71) adapted to the lamp base (4); the mounting chamber (71) is in close fit with the lamp base (4);

when the waterproof kit (7) is made of a soft rubber material, the waterproof kit (7) tightly wraps around the lamp base (4); and when the waterproof kit (7) is made of a hard rubber material, the waterproof kit (7) is in threaded connection with or clamped to the lamp base (4).

10. The multifunctional and variable lamp according to claim 9, wherein the sling (8) is integrally formed with the waterproof kit (7), or a lower end of the sling (8) is connected to the waterproof kit (7) through a connection position at a top of the waterproof kit (7); and an annular hanging hole (81) is arranged at an upper end of the sling (8).

11. The multifunctional and variable lamp according to claim 5, wherein the transparent bracket is of an integrated structure, a material of which comprises ceramic, glass, sapphire, or a transparent printed circuit board (PCB); and at least two layers of circuits for electrical connection are arranged on the transparent bracket.

12. The multifunctional and variable lamp according to claim 5, wherein the entire driving bin (3) is cylindrical, comprising a driving bin upper cover (301) and a driving bin lower cover (302); a clamping slot is arranged at a position, opposite to the switch control board (5) and rechargeable battery (6), in the driving bin (3); and the switch control board (5) and the rechargeable battery (6) are correspondingly clamped in the clamping slot.

* * * * *